July 10, 1956
C. H. TAMPLIN
2,753,634
PRECISION MEASURING MACHINES
Filed March 28, 1951
6 Sheets—Sheet 1
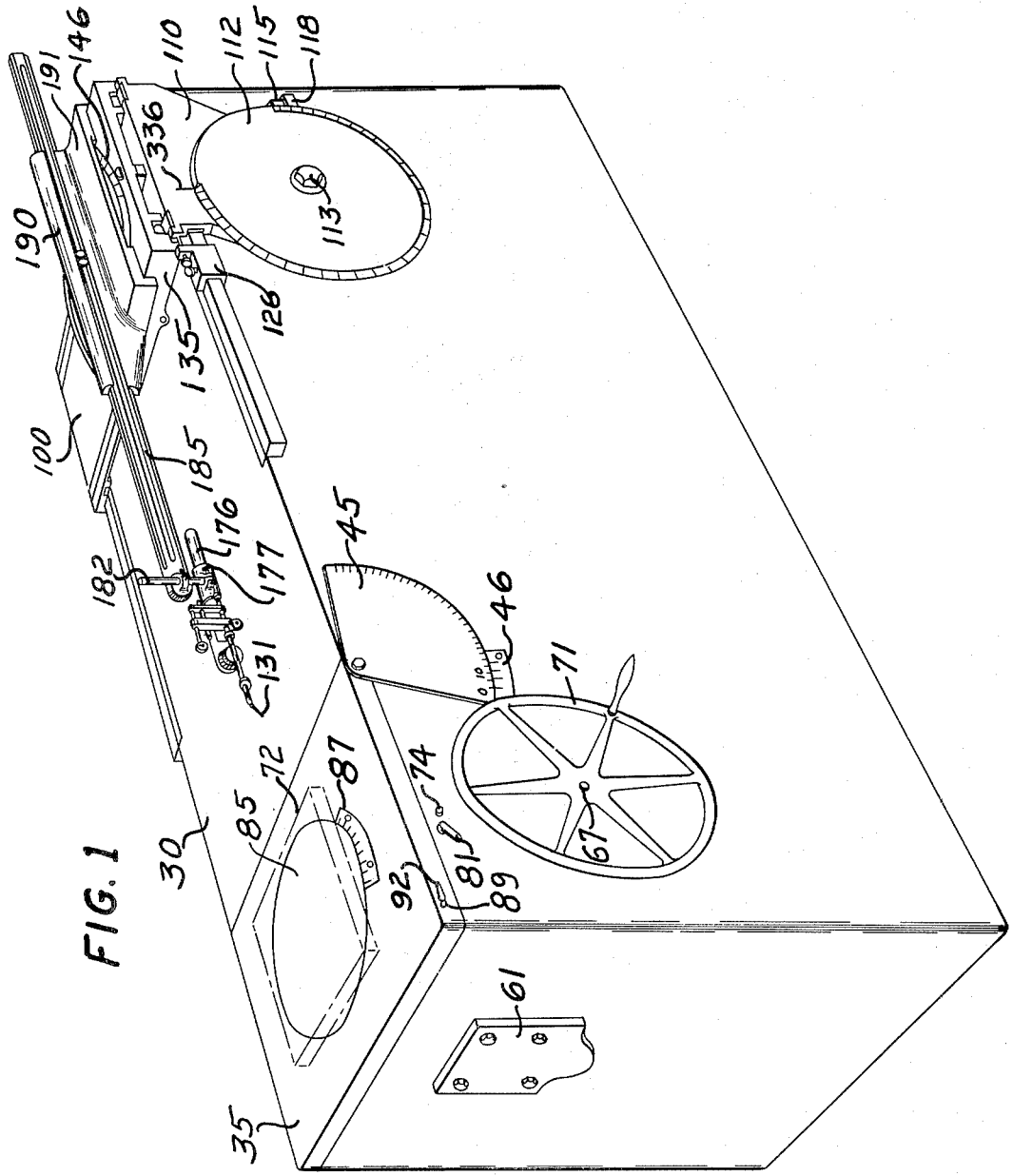
Inventor
Clarence H. Tamplin
By Ayres D. Stoddard
Attorney

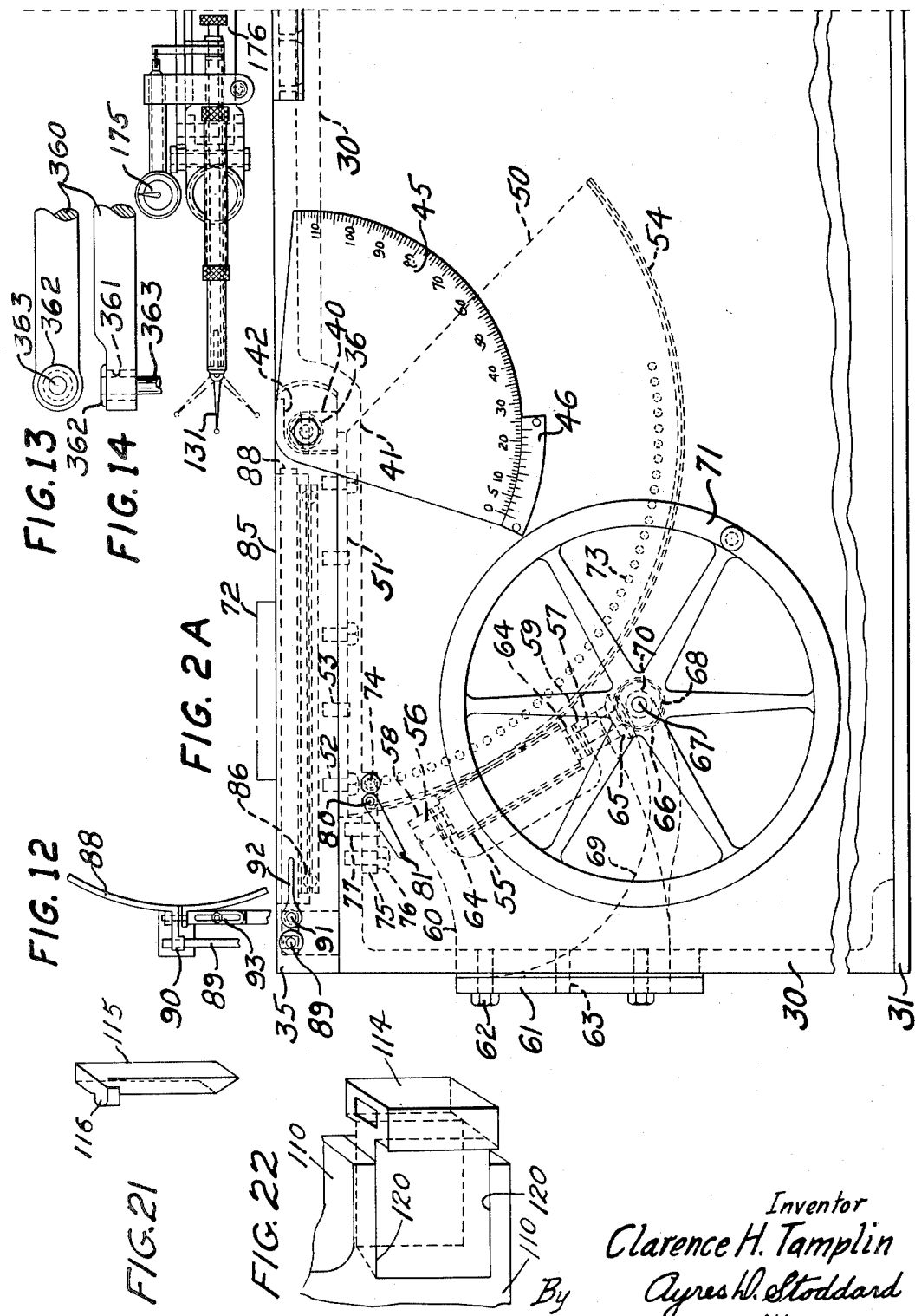

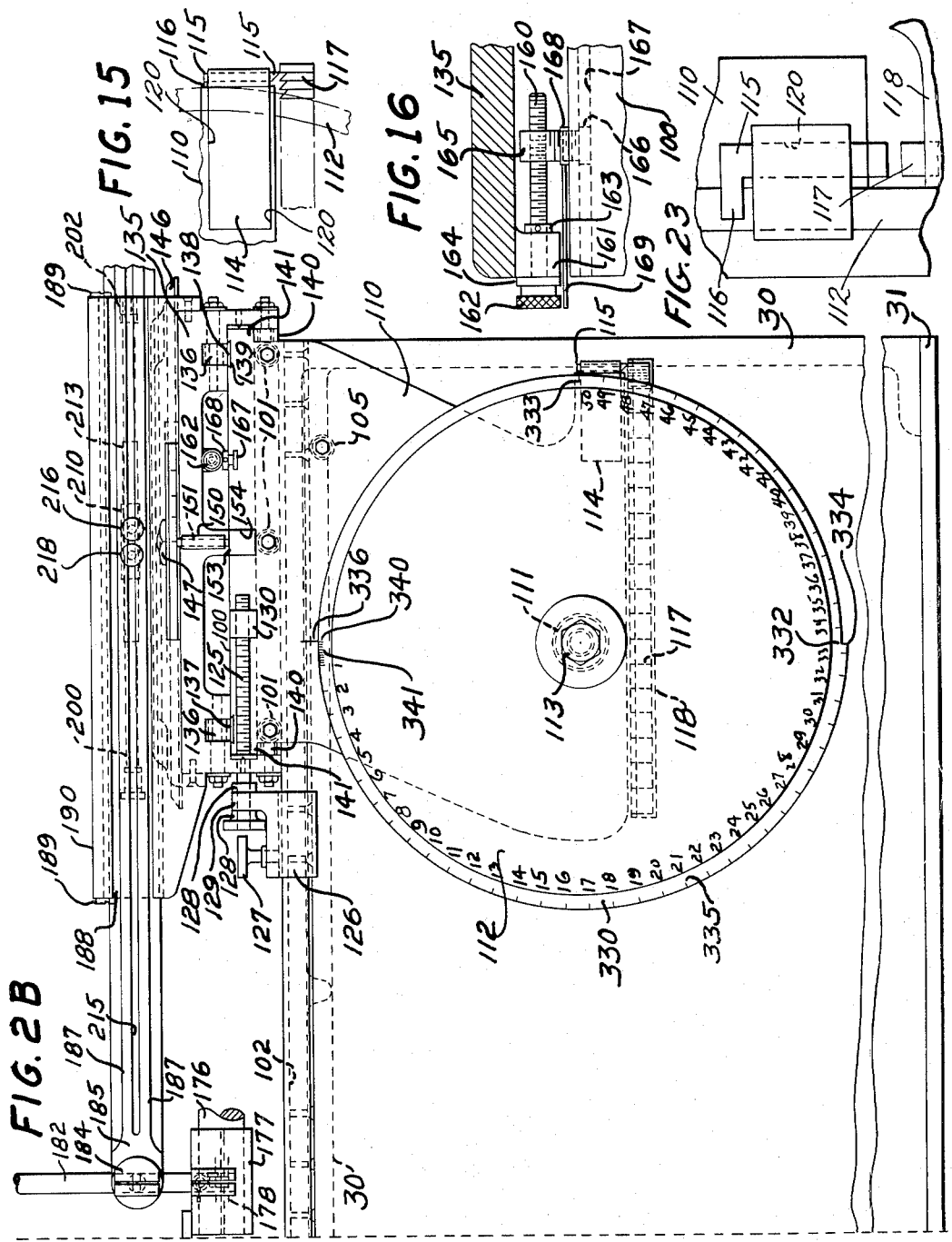

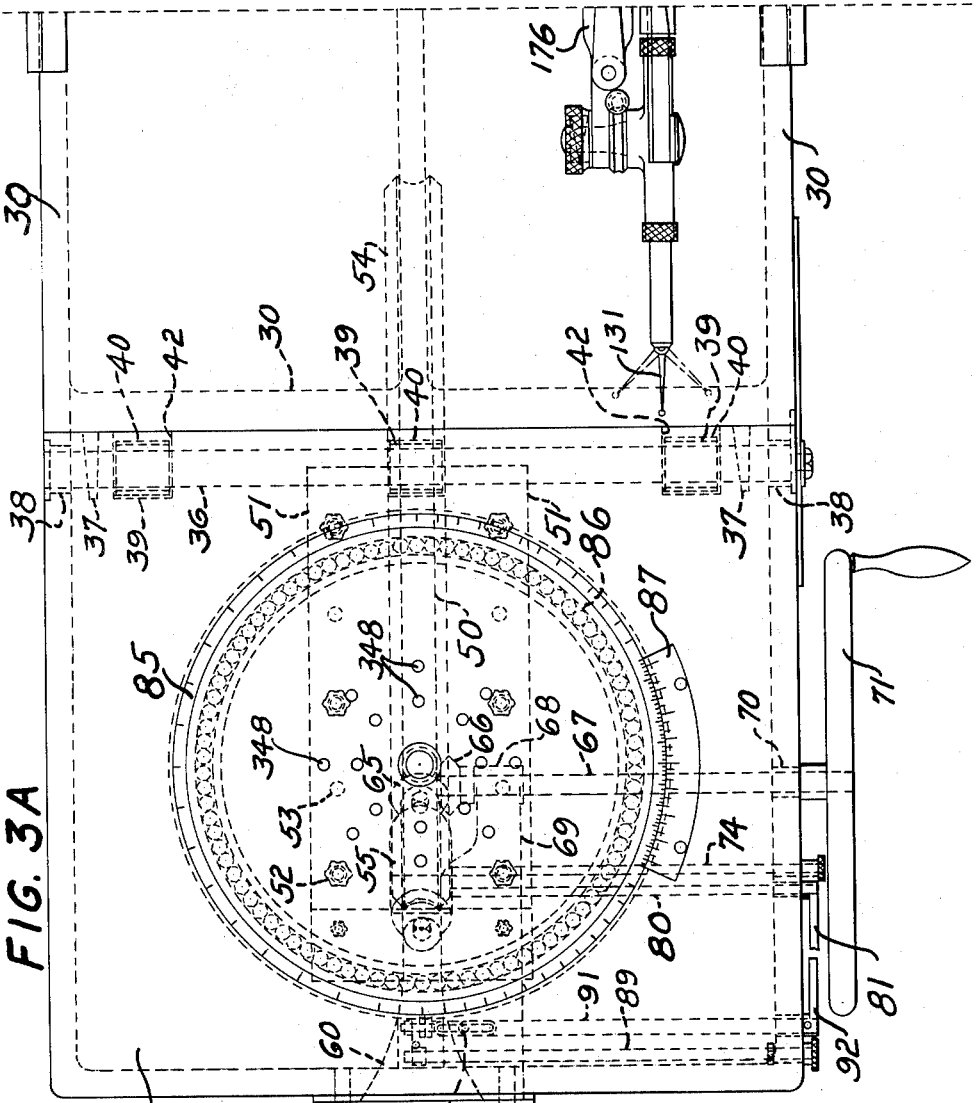

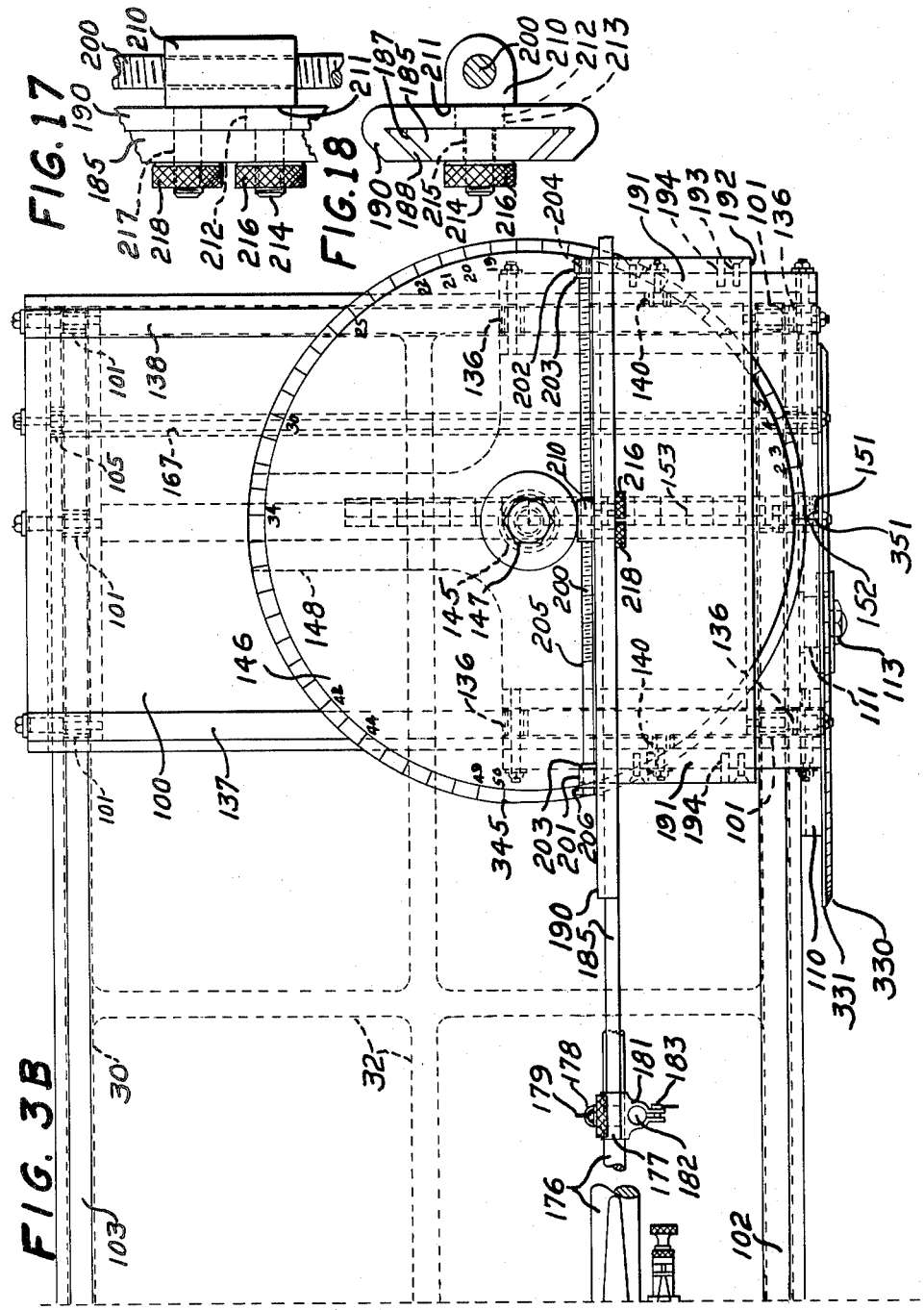

July 10, 1956
C. H. TAMPLIN
2,753,634
PRECISION MEASURING MACHINES
Filed March 28, 1951
6 Sheets-Sheet 6
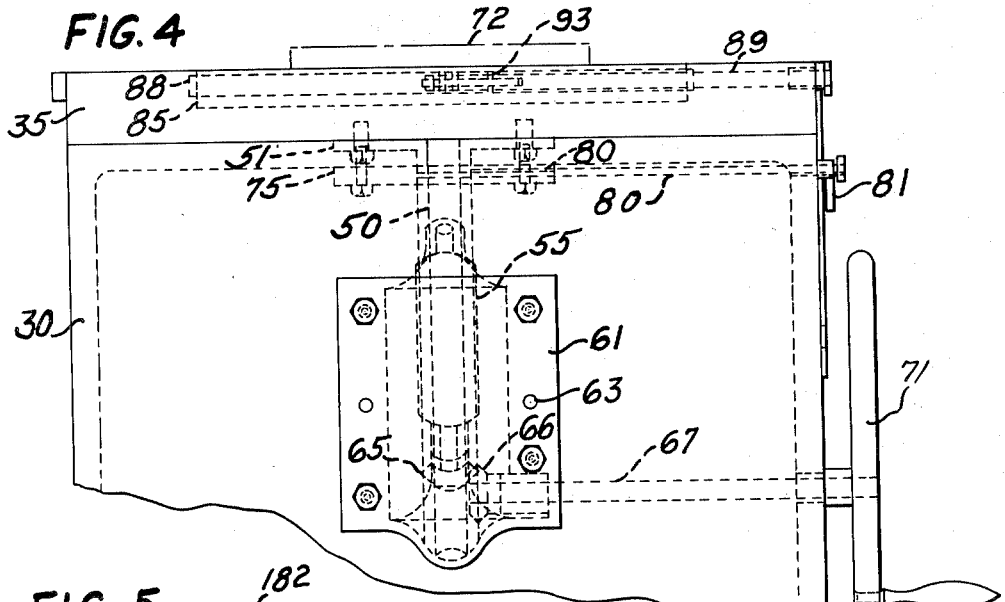
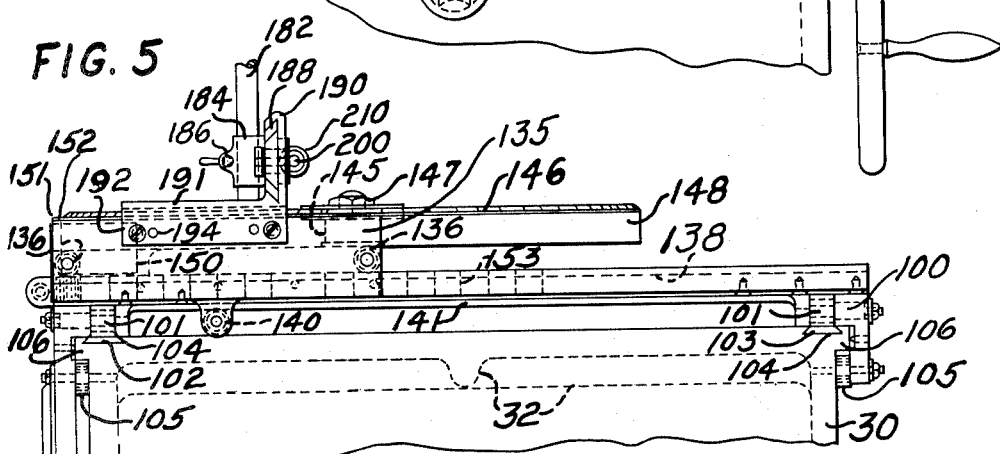
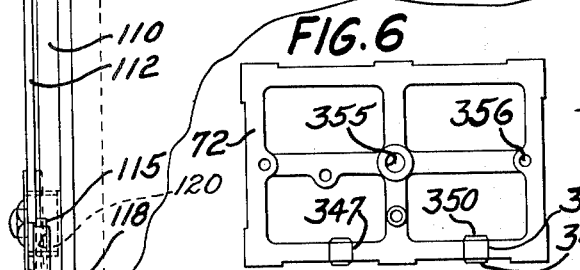
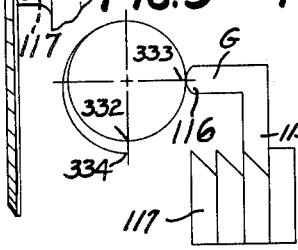
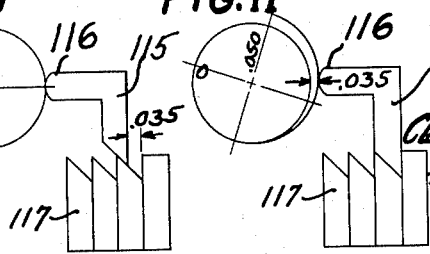
Inventor
Clarence H. Tamplin
By Agnes D. Stoddard
Attorney

United States Patent Office 2,753,634
Patented July 10, 1956

2,753,634

PRECISION MEASURING MACHINES

Clarence H. Tamplin, Dayton, Ohio

Application March 28, 1951, Serial No. 217,986

5 Claims. (Cl. 33—174)

My invention relates to a novel type of precision measuring machine by the use of which an operator can measure or check any dimension of an object or piece, such as a part used in the manufacture of any device, or it can readily be used to check the various dimensions of tools, such as jigs, fixtures, or dies of various types.

Therefore my invention may well be termed a universal precision measuring machine, as it embodies novel features which provide a method of measuring with the utmost in quality of exactness and precision of dimensional checking and measuring.

My novel universal measuring machine is constructed so as to enable an operator to measure or check any dimension in any of the three dimensional factors, including angular dimensions, without resorting to the conventional method of comparison with a previously established standard, one such standard being determined by transposing a given dimension on a drawing to suit such comparative method of checking.

My measuring machine thus eliminates the possible errors which very frequently occur when transposing figures, and also considerably reduces the time consumed by such method of checking.

Therefore, to save time and obtain the ultimate in accuracy is an important factor in the manufacture of precision machinery, tools and parts.

It is, therefore, one object of my invention to provide a measuring machine which is universal in scope relative to three dimensional measurements.

Another object is to provide a precision measuring machine having traveling carriages movable at right angles to each other, and each carriage carrying a graduated disk cooperating with a set of gauge blocks and a contact plunger to obtain precision measuring of the distance of travel of the respective carriages.

Another object of my invention is to provide a measuring machine of the above type with both lateral and transversely movable carriages combined with means to provide accurate readings of the distance each and/or both carriages move to accurately determine the dimensions of a piece of work being measured or checked by the machine.

A further object is to provide a circular graduated disk for each carriage, a plurality of gauge blocks associated with each disk and feeler members adapted to cooperate with the disks and blocks to determine the exact travel or movement of the carriages.

Another object of my invention is to provide the transverse carriage with a feeling device for contacting the work to be checked or measured.

A still further object is to provide a measuring machine with a lateral carriage cooperating with a dimension amplifying device to determine the distance of movement of the carriage.

Another object is to provide said lateral carriage with a transverse carriage which carries a feeling device to contact the work being checked or measured, whereby, by the combination of movements of both carriages, dimensions at right angles are easily obtained.

A further object is to provide a rotatable table or platform upon which the work is secured so as to permit turning the work piece whereby any angular point thereon may be contacted by the feeling device to obtain, through the two carriages, dimensions other than square dimensions, the rotatable table being provided with a vernier to determine the angular adjustment of the table.

Another object is to provide a tiltable device to carry or support said rotatable table, whereby said table and the work piece thereon may be tilted to any angle from the horizontal to 90°, an angular vernier being provided to read the angular adjustment of the table and the work piece.

A further object is to provide means to lock the transverse carriage, the lateral carriage, the rotatable table and the tiltable device in any position into which they have been adjusted while obtaining any and all of the various measurements of the work piece.

Another object is the provision of a compact, practical universal precision measuring machine, whereby all dimensions ever necessary to duplicate or manufacture a part or work piece may be readily obtained by the combinations of movements of the several measuring elements, and the ultimate results obtained through the amplification of reading and measuring elements in connection with accurately manufactured gauge blocks which are so arranged relative to the amplifying elements that only exact measurements can be obtained.

With these and other incidental objects in view my invention relates to certain novel features and combinations of novel constructions of parts, the essential elements of which are set forth in appended claims, in a preferred and modified form of embodiment which are hereinafter described with reference to the drawings which accompany and form a part of this specification.

In the drawings:

Fig. 1 is a perspective view of my novel universal precision measuring machine.

Figs. 2–A and 2–B together constitute a front elevation of the same.

Figs. 3–A and 3–B together constitute a top plan view of the same.

Fig. 4 is a left end elevation, partly broken away.

Fig. 5 is a right end elevation, partly broken away.

Fig. 6 is a sample of a work piece to be measured.

Fig. 7 shows a triangle with dimensions to illustrate the method in determining these dimensions by the principle of a right angled triangle.

Fig. 8 shows a so-called "circular triangle" whereby the same results may be obtained as is obtained by the regular right angled triangle.

Figs. 9, 10 and 11 illustrate, diagrammatically, how the graduated disk is used in combination with a set of gauge blocks and a contact plunger to determine the distance of travel of the carriage, there being a graduated disk, a set of gauge blocks and a contact plunger associated with each carriage.

Fig. 12 is a fragmentary detail of a part of the work table gripping, adjusting and locking band.

Fig. 13 is a plan view of an adapter, broken away, with a bushing to be used in the feeler device to hold a plug to be inserted in holes in the work being measured or checked, to ascertain the dimensions from center to center of holes.

Fig. 14 is a side elevation of the same adapter.

Fig. 15 is a fragmentary, enlarged detail showing the relationship between the graduated disk, the contact plunger and the gauge blocks.

Fig. 16 is an enlarged detail of the transverse carriage adjusting and locking means.

Fig. 17 is a fragmentary plan view of the indicator bar adjusting and locking means, in enlarged scale.

Fig. 18 is an edge view of the same.

Fig. 19 is a modified form of a holder for a group of gauge blocks to be used in conjunction with the graduated disk.

Fig. 20 is plan view of the same.

Fig. 21 is a perspective view of the slidably mounted plunger.

Fig. 22 is a perspective view of the slidably mounted block which carries said plunger.

Fig. 23 is an enlarged view of that part of Fig. 5 which shows the relationship of the graduated dial, the carriage apron, the plunger, the plunger supporting block and the gauge blocks.

GENERAL DESCRIPTION

A general description of my universal precision measuring machine will now be given, along with basic principles used in connection therewith to obtain the extreme accurate measuring which may be accomplished by the novel combinations of devices and means which comprise the vital parts of the machine.

To illustrate my invention I have shown a machine which is practical for checking dimensions and for measuring dimensions of jigs, fixtures, tools and parts of all kinds. The machine has a bed approximately 6½ feet long, 3 feet high and 2 feet wide. On the top part of this bed or frame is mounted a tilting table, and embedded in this table is a rotating table approximately 18 inches in diameter on which is mounted the work to be checked or measured. This table rests on ball bearings and can be rotated through 360°, and can also be tilted at any angle from 0 degrees to 90 degrees, and it is equipped with vernier scales for close and accurate settings.

On the right top side of the main bed is mounted two movable carriages, one to travel in a lateral direction and one to travel in a transverse direction. Both of these tables or carriages are mounted on roller bearings and accurately guided in their directions of movements by carefully machined ways.

The movements of these carriages in both lateral and transverse directions determines the dimension of the particular part of the work that is being checked or measured. The method employed in determining these dimensions is illustrated in the principle of a right angled triangle which is shown in Fig. 7, wherein it will be readily seen that a slight movement in direction A will cause a much greater movement in direction B. In other words a movement of .050 in direction A will cause a movement of 50.000" in direction B, likewise; .001 at A equals 1.000" at B; .0001 at A equals .100" at B and .00001 at A equals .010" at B.

As the use of a straight triangle would require too much space for practical purposes, it was found that the same results could be obtained by the use of a cam which is illustrated in Fig. 8. In this Fig. 8 the true circle A—B equals the base of the triangle, that is, 50.000"; the eccentric circle A—C equals the hypotenuse, that is, 50.00025"; and the side B—C equals the side opposite, that is, .050".

The unit measurement .050 thickness is acquired by the use of accurately ground gauge blocks of .050 thickness. Such gauge blocks can be purchased on the market and as they are guaranteed to be of a very high degree of accuracy, the use of a number of these blocks insures a positive dimension at every fifty thousandths of an inch. The division of this .050 dimension into smaller denominations as .001–.0001 and .00001 is accomplished by the use of the cam described above.

Figs. 9, 10 and 11 of the drawings illustrate how these smaller denominations are accomplished and therefore how very accurate measurements can be obtained with my invention.

The disk is attached to the carriage and, together with the contact plunger G, is carried along with the carriage, thus, the plunger G is free to move in both a lateral and a vertical direction.

Starting from zero position the plunger G is in contact with the right hand gauge block as shown in Fig. 9, and also in contact with the disk at a corresponding mark 0. This 0 mark is shown in Figure 11. Now, if the carriage moves a distance of .035, the contact plunger G is moved away from the 0 block a distance of .035. By pressing down on the plunger with the finger, it will slide down the angle of the block until it again contacts the zero block. This leaves a gap between the point 0 on the plunger and the corresponding point 0 on the disk. Now by rotating the disk until this gap is closed, and reading the calibration on the disk, it will be found that the carriage has moved a distance of .035". Now if a piece is being checked by the figures on a drawing and the drawing calls for a dimension of .0347 for this particular point it will be readily seen that a discrepancy of .0003" exists.

This same principle applies to any dimension within the scope of the machine, which according to the illustrated form is 18" in both lateral and transverse directions.

To accomplish this method of measuring within the scope of 18", 360 gauge blocks are required in each of two groups, one group of blocks being associated with the lateral carriage and another group of blocks being associated with the transverse carriage.

The rotatable table at the left top of the machine is to be turned by hand to the general position desired and then the turning is finished by means of a screw adjustment, and after the table is finally adjusted to the desired position it can be locked in such finally adjusted position.

The tilting table which carries the rotatable table is tilted by means of a hand wheel through worm segment and worm gear and is set according to the angular vernier with which the tilting table is provided. This tilt table may also be locked in set position.

The lateral carriage is moved by hand to the approximate position and then is adjusted to its final position by a screw adjuster, and said lateral carriage may also be locked in any position of adjustment.

The transverse carriage is carried by the lateral carriage and it too is first moved to the approximate position by and then into its final position by a screw adjuster. This transverse carriage may also be locked in any of its positions of adjustment.

The transverse carriage carries a guide bar in which is supported a standard type of feeler to actually contact the work which is being checked or measured. The feeler is mounted in a slidable bar carried by the guide bar and may be adjusted in said guide bar to approximate position and locked in that position.

The graduated disks having the calibration figures thereon are turned by hand and the plunger G is adjusted as previously mentioned to obtain the final dimensions.

Thus, by the combined movements of the rotatable table, the tiltable table, the lateral carriage and the transverse carriage all types of dimension of work pieces can be very accurately obtained.

DETAILED DESCRIPTION

Bed or frame

Described in detail my universal precision measuring machine, includes a rectangular bed or frame 30 (Figs. 1, 2A and 2B, 3A and 3B) secured to a base 31. The frame 30 may be made of cast iron and when so made it is provided with strengthening webs or ribs 32.

Tiltable work table

At the left end of the frame 30 is a tiltable work table 35 (Figs. 1, 2A and 3A) secured to a shaft 36 by taper dowel pins 37. The shaft 36 is mounted near its ends in two bushings 38 in the frame 30 and in three other bushings 39 in lugs 40 projecting upwardly from an offset part 41 of the frame 30. The table 35 is recessed at 42 to accommodate the lugs 40.

Secured to the shaft is a segmental plate 45 having angular graduation marks to cooperate with a vernier plate 46 secured to the side of the frame 30, to register the angular adjustment of the tiltable table 35.

Work table tilting means

Secured to the bottom of the table 35 at the central part thereof is a worm gear segment 50 having flanges 51 by means of which said segment 50 is bolted and doweled to the bottom of the table 35 as shown by the bolts 52 and dowels 53. The entire circular edge of the segment 50 is provided with worm gear threads 54 with which meshes a worm 55 having trunnions 56 and 57 mounted in bearings 58 and 59 of a bracket 60 having flanges 61 to receive bolts 62 and dowel pins 63 by means of which the bracket is mounted to the end of the frame 30 (Figs. 2A, 3A and 4). Collars 64 pinned to the trunnions 56 and 57 properly locate the worm 55 between the bearings 58 and 59.

Secured to the trunnion 57 is a bevel gear 65 meshing with a bevel gear 66 secured to a shaft 67 mounted in a bearing 68 of a bracket 69 integral with the bracket 60 and flanges 61. The outer end of the shaft 67 is mounted in a bearing 70 in the frame 30.

Secured to the outer end of the shaft 67 outside of the frame 30 is a hand wheel 71 by means of which the shaft 67 and bevel gear 66 turn the bevel gear 65 and worm 55 whereby the latter turns the worm gear segment 50 to tilt the table 35 to any desired angle from a horizontal up to a vertical position and beyond as shown by the vernier markings on the plate 45 to set a work piece designated for example by the dot and dash lines and numbered 72.

The segment 50 has locating or locking holes 73 spaced 2½ degrees apart. Mounted in radial alignment with the holes 73 is a locking pin 74 (Figs. 2A, 3A and 4) adapted to be pulled outwardly and inserted into any hole 73 when the table 35 is tilted to any of the 2½ degree positions. This pull pin 74 is mounted in the frame 30 and guided near its end by a block 75 secured to the offset part 41 of the frame 30 by two bolts 76 and two dowel pins 77.

To positively lock the table 35 in any angular tilted position between the 2½ degree ranges the block is threaded to receive a flat ended screw 80 the flat end of which abuts against the side of the segment 50. This screw 80 is also threaded in the frame 30 and has a handle 81 secured thereto by means of which the screw 80 may be tightly pressed against the side of the segment 50 to lock the same and the tiltable table 35 in any angular position of adjustment.

Therefore the work 72 on the table 35 may be set in any desired angular position and locked in such position for checking or measuring purposes.

Rotatable table

The tiltable table 35 has mounted therein a rotatable table 85. This table 85 is mounted on ball bearings 86 to provide easy movement of the table 85. The ball bearings 86 are precision made and are therefore very accurate and maintain the table 85 flush with the table 35 at all times.

The table 85 has vernier graduation marks as shown in Fig. 3A, and co-operate with a vernier plate 87 for fine and accurate angular adjustment of the table 85.

The table 85 is provided with a split gripping and locking band 88 (Fig. 12) by means of which the table 85 may be closely adjusted through the medium of an adjusting screw 89 which is threaded into a lug 90 of the split band 88. This screw has a bearing in the frame 30.

The band 88 is tightened around the table 85 by a clamping screw 91 having a handle 92 and a pin and slot connection 93. By turning the handle 92 the screw 91 draws the split ends of the band 88 towards each other thus tightly clamping the band 88 around the table 85. Now when the screw 89 is turned for close adjustment the table 85 may be closely adjusted to set it at the exact desired angle.

Lateral carriage

Mounted to move from right to left and vice versa is a lateral carriage 100 (Figs. 2B, 3B and 5). The carriage 100 carries 6 accurately ground rollers 101 three of which roll on a ground bar 102 and three of which roll on a ground bar 103. The bars 102 and 103 are ground to fit dovetail grooves 104 in the frame 30 in which said bars 102 and 103 are mounted.

To insure that the rolls 101 remain on the bars 102 and 103 the carriage 100 has two eccentrically adjustable rollers 105 which ride underneath flanges 106 on the frame 30.

Integral with the front of the lateral carriage 100 is an apron 110 on which is accurately mounted by means of a bearing 111 a graduated disk 112. A bolt 113 holds the disk 112 in place and is tightened so that the disk 112 can be turned.

Also slidably mounted in a recess 120 (Figs. 22 and 23) in the apron 110 is a block 114 in which is slidably mounted a plunger G 115 having a contact finger 116 to co-operate with the periphery of the disk 112. The bottom of the plunger 115 is beveled to exactly fit the bevel tops of gauge blocks 117 which are carried in a long lug or boss 118 on the frame 30. When the plunger 115 is pressed down to engage the bevel of the gauge block 117, it causes, by its camming action, a movement of itself and of the block, laterally until stopped by the contact of the edge of the plunger with the edge of the next block 117 to the right. These gauge blocks 117 are .050" thick and there are 360 of them mounted in the boss 118 thus representing 18" of the travel for the carriage 100, the disk 112 and plunger 115. The disk 112 will be described in detail later.

The lateral carriage 100 may be closely adjusted by an adjusting screw 125 (Fig. 2B) carried by a slidable block 126 which, through the screw 125 moves with the carriage 100 as it is being adjusted to its approximate position. When in such approximate position the block is locked to the frame 30 by a locking screw 127. Then the adjusting screw 125, which has collars 128 secured to it on each side of a projection 129 on the block 126, is turned. The screw 125 being threaded into a lug 130 on the carriage 100 adjusts the carriage 100 relatively to the frame 30 until a feeler 131 (Fig. 3A) contacts the work piece at the desired point. By this screw 125 minute adjustment of the carriage 100 may be obtained.

Transverse carriage

Mounted to move from front to back and vice versa on the lateral carriage 100 is a transverse carriage 135 (Figs. 1, 2B, 3B and 5). This transverse carriage 135 carries 4 accurately ground rollers 136 two of which roll on a ground bar 137 and two of which roll on a ground bar 138. The bars 137 and 138 are ground to fit dovetail grooves 139, cut in the top of the lateral carriage 100, and in which said bars 137 and 138 are mounted.

To insure that the rollers 136 remain on the bars 137 and 138 the transverse carriage 135 has two eccentrically adjustable rollers 140 which ride underneath flanges 141 on the lateral carriage 100 (Figs. 2B and 5).

Accurately mounted on top of the transverse carriage 135 by means of a bearing 145 is a graduated disk 146 like the disk 112. A bolt 147 holds the disk 146 in place and is tightened so that the disk 146 can be turned. An extended arm 148 of the transverse carriage aids in maintaining the disk 146 in its proper flat position.

Also carried by the transverse carriage 135 is a block 150 in which is slidably mounted a plunger 151 like the plunger 115 and having a contact finger 152 to co-operate with the periphery of the disk 146. The bottom of the plunger 151 is beveled like the bottom of the plunger 115, to exactly fit the beveled tops of gauge blocks 153 which are carried in a groove 154 in the top of the lateral carriage. These gauge blocks 153 are .050" thick and there are 360 of them mounted in the groove 154 thus representing 18" of travel for the carriage 135, the disk 146 and plunger 151. This disk 146 is identical with the disk 112 which will be later described.

The transverse carriage 135 may be closely adjusted relative to the lateral carriage 100 by an adjusting screw 160 (Figs. 2B and 16) carried by a lug 161 on the transverse carriage 135. The adjusting screw 160 has a knurled head 162 to facilitate turning the same. The screw 160 is prevented from longitudinal movement relative to the carriage 135 by means of a collar 163 pinned to the screw in such a position as to maintain a shoulder 164 against the lug 161 with just enough clearance between the collar 163, lug 161 and shoulder 164 to permit free turning of the adjusting screw 160. This screw 160 is threaded into a stud 165 with a square stud 166 adapted to slide in a T slot 167 in the top of the lateral carriage 100. The stud 165 is threaded to receive a lock nut 168 having secured thereto a finger piece 169 to turn the nut 168 to lock the stud 165 in the T slot 167.

Normally the nut 168 is loose, that is, it is turned to such a position as to leave a clearance between said nut 168 and the top of the carriage 100 thus permitting a free sliding movement of the square stud 166 in the T slot 167 when the transverse carriage 135 is moved into an approximate measuring position as governed by the feeler 131. After such approximate adjustment, the lock nut 168 is tightened on the stud 165 against the top of the carriage 100 by the finger piece 169 to lock the stud head 166 in the T slot. After this has been done the operator turns the adjusting screw 160 in the desired direction to cause the feeler 131 to contact the exact point to be checked or measured, and since the stud 165 is now locked to the lateral carriage 100 the turning of the screw 160 closely adjusts the transverse carriage relatively to the lateral carriage.

Work feeler and mounting for same

The work feeler 131 (Figs. 1, 2A and 3A) is a standard purchased device and includes the usual indicator dial 175. The feeler 131 is adjustable, as usual, into various positions for convenience. The entire feeler unit, including the indicator dial 175 is mounted on a bar 176 supported in a split clamping sleeve 177 having a split lug 178 (Fig. 2B) to receive a clamping screw 179 with a finger pin 180 for tightening purposes. The bar of course is slidably adjustable in the sleeve 177.

Integral with the sleeve 177 is a vertical split sleeve 181 to receive a rod 182 which is clamped therein by a clamping screw 183. This rod 182 is, in turn, slidably adjustable in a split boss 184 integral with an indicator supporting bar 185. A clamping screw 186 clamps the rod 182 to the bar 185.

The indicator supporting bar 185 has beveled edges 187 along the top and bottom thereof to fit in between accurately ground beveled way bars 188 mounted in ground beveled ways of an indicator supporting bar housing 190 extending upwardly from a plate 191. The way bars 188 are prevented from sliding out of either end of the housing ways by means of cap screws 189. The plate 191 has flanges 192 by means of which it is mounted on the transverse carriage 135 with screws 193 and located accurately thereon by dowels 194. This plate 191 spans a part of the graduated disk 146 but there has been clearance provided between the top of the disk 146 and the underside of the plate 191.

The indicator supporting bar 185 is adapted to be closely adjusted relative to the housing 190 in order to set the feeler 131 to the desired position. The means for so adjusting the bar 185 includes a rotatable adjusting rod 200 (Figs. 2B, 3B and 5) turnably mounted in a pair of lugs 201 and 202 on the back side of the housing 190.

There are three collars 203 pinned to the rod 200 adjacent the lugs 201 and 202 to prevent any longitudinal movement of the rod 200 relative to the housing 190.

The rod 200 has a reduced diameter pilot or tenon 204 projecting into the lug 202 and is threaded from the inner end of the tenon 204 to point 205. The rod 200 also has a knurled knob 206 to facilitate turning of the rod 200.

Threaded on the rod 200 is a block 210 having a flat surface 211 adjacent the back of the housing 190. The block 210 has a square guide tenon 212 projecting through a slot 213 in the housing 190 and contacting the back side of the bar 185. A threaded tenon 214 projects from the guide tenon 212 through a slot 215 in the bar 185, to receive a knurled lock nut 216, which when tightened down against the face of the bar 185 locks the bar 185 to the block 210.

Therefore, by turning the rod 200 by means of its knurled knob 206 the block 210 and bar 185 are adjusted relatively to the housing 190.

After the bar 185 has been thus adjusted, the bar 185 and block 210 are then locked to the housing 190 by the following means. Projecting from the flat surface 211 of the block 210 and through the slot 213 of the housing and through the slot 215 in the bar, is a stud 217 threaded to receive a knurled lock nut 218.

By tightening the lock nut 218 down against the face of the bar 185 the surface 211 of the block 210 is pressed against the back of the housing 190, the block 210 being wider than the slot 213 in the housing 190, thus locking the adjusted bar 185, the block 210 and the housing together to prevent any relative movement between any of them.

Therefore when the transverse carriage 135 is moved on the lateral carriage 100 the feeler 131 is moved transversely of the machine and as the transverse carriage 135 is carried by the lateral carriage 100, the feeler 131 is moved laterally of the machine.

Graduated disks

Since both of the graduated disks 112 and 146 are identical, a detailed description of the disk 112 will suffice for both. This disk 112 is diagrammatically shown in Figs. 8 to 11.

The disk 112 (Fig. 2B) has a beveled edge 330 all around the top leaving a narrow edge 331.

From point 332 on the edge 331 to point 333 the radius from the center of the disk 112 is the same, that is the periphery is concentric with the disk center. Beginning at point 333 (Fig. 2B) is where the plunger finger 115 contacts the edge 331 (Fig. 3B) of the disk and going counter-clockwise around the disk the radius gradually increases each .0001 of an inch until it reaches point 334 (Fig. 2B) which is in radial alignment with point 332. At point 334 the radius has increased .050 of one inch, thus the total amount of rise of the periphery of the disk 112 from point 333 to point 334 is exactly equal to the thickness of each individual gauge block 117 which as previously described is .050 of one inch.

For convenience of reading the vernier graduations 335 on the disk 112 a vertical "0" (zero) line 336 is etched, engraved or cut on the front side of the apron 110 on the lateral carriage 100 just above the disk 112 as shown in Fig. 2B.

Also for convenience of reading there is a "0" line 340 on the disk. The space between the "0" line 340, in a counterclockwise direction, and the point 333 is divided into 50 equal spaces, and so marked with the graduation lines 335. These lines are numbered 1 to 50 and each space represents .001 of one inch rise on the periphery between the points 333 and 334.

Each space 0 to 1, 1 to 2 etc. is provided with shorter radial lines 341 which divide the spaces 0 to 1, and 1 to 2 etc. into ten more spaces each of these ten spaces representing a rise of .0001 of one inch rise on the periphery between the points 333 and 334.

In actual contemplated size of the disk 112 the space between each vernier graduation line 341 is .10 of one inch and the distance between each line 335 is 1 inch, thus making for extreme precision in measuring the travel of the lateral carriage 100 which represents the measurements between points on the work piece 72 contacted by the feeler 131.

As previously stated the disk 146 is like the disk 112 above described in detail, except the vernier graduation marks. On this disk 146 the 0 line is at the point of contact with the plunger finger 152 which is the same as point 333 on the disk 112. The graduations progress counter-clockwise around the disk 146 to the "50" line which is at point 345 and this point 345 on the periphery is .050 of one inch farther from the center of the disk 146 than is the point of contact ("0" line) of the plunger finger 152 with the disk 146.

Operation of method of measuring

Assuming that the operator wishes to measure from surface 346 to surface 347 on the work piece 72 (Fig. 6), the lateral carriage 100 is positioned as shown in Figs. 2B and 15 with the plunger 115 contacting the gauge block 117 at "0" (zero) and with the "0" mark or line 340 in register with the mark or line 336 on the apron 110. Let us also assume that the distance from 346 to 347 is 2.035 inches.

The work piece 72 is "squared" on and then firmly clamped to the rotatable table 86 by the use of any of the usual and well known means such as bolts and bars (not shown) the table 86 being provided with a plurality of tapped holes 348 for this purpose. The table 86 of course having been properly adjusted for "square" dimensioning by its vernier.

The feeler 131 may then be turned by turning the rod 182 in the indicator bar 185 to bring the feeler 131 in proper range relative to the surface 346, after which the bar 185 is positioned and adjusted relative to the housing to bring the feeler 131 into measuring contact with the surface 346.

When this has been accomplished the lateral carriage is moved to the left (Figs. 2A and 2B), the locking screw 127 having been first loosened, until the feeler 131 touches the surface 347 with the same pressure as indicated by the dial 175 when the feeler 131 touched the surface 346. This last final adjustment of contact of the feeler 131 with the surface 347 being accomplished by again locking the block 126 to the frame 30 with the locking screw 127, and then turning the adjusting screw 125 to accurately adjust the carriage 100 and feeler 131.

During the travel of the lateral carriage, as just mentioned, the plunger 115 passed over a number of the gauge blocks 117, and since the distance between the surfaces 346 and 347 is 2.035 inches, the plunger 115 passed over 40 gauge blocks 117 and stopped above the 41st block 117 in a position shown in Fig. 10 above the block. The plunger 115 is now pushed downwardly until its right side contacts the next block 117 to the right and the bevels on the plunger and block coincide.

Such downward movement of the plunger 115 caused the block 114 to slide and move the finger 116 away from the point 333 on the periphery of the disk 112. Now the operator turns the disk 112 clockwise until the periphery of the disk 112 again contacts the plunger finger and then reads the vernier at the line 336. Since the distance between the surfaces 346 and 347 is 2.035 inches the plunger 115 had travelled past 40 of the .050" gauge blocks 117 plus .035 of one inch more and, therefore, the gap between the disk 112 and finger 116, after the plunger 115 was pressed down into the position shown in Fig. 11, is .035 of one inch. Thus, when the disk 112 is turned clockwise to close said gap the vernier line numbered 35, representing .035 rise from point 333 to said line 35, registers with the line 336 thus telling the operator that the precise distance between the surfaces 346 and 347 is 2.035 inches.

Now to measure the thickness of lug from surface 349 to surface 350 let us assume that this distance is .321 inch.

To make this measurement the transverse carriage 135 is placed at "0" (zero) with the periphery of the disk 146 contacting the plunger finger 152 (Fig. 3B) with the "0" vernier line on the disk 146 in register with a line 351 on the top of the plunger 151 and finger 152. The feeler 131 is adjusted until it touches the surface 349, the transverse carriage 135 being at "0". This carriage 135 is now unlocked from the lateral carriage by loosening the lock nut 168 (Fig. 16) after which the carriage is moved until the feeler 131 contacts any type of straight edge pressed against the surface 350. The lock nut 168 is tightened and the final adjustment of the carriage 135 is made by the adjusting screw 160.

The carriage 135 travelled .321 inch and therefore the plunger 151 passed over 6 of the gauge blocks 153 plus .012 more. The plunger 151 is now pushed downwardly to move it backward against the vertical side of the adjacent gauge block 153 thus creating a gap between the plunger finger 152 and the periphery of the disk 146. Now the disk 146 is turned clockwise until it again contacts the finger 152 which will place the vernier line "21" in register with the line 351 on the plunger 151 and finger 152, thus indicating to the operator that the distance from surface 349 to 350 is .312 inch which measurement is ascertained by the thickness of 6 gauge blocks 153 which equals .300, plus the .210 of one inch indicated by the reading from the disk 146.

From the above description it is clear that any dimensions may be obtained from a work piece by the combined movements of the lateral carriage 100, the transverse carriage 135, the two disks 112 and 146, the plungers 115 and 151 and the groups of gauge blocks 117 and 153 and that the dimensions thus ascertained are very precise due to the novel constructions of the several parts above mentioned.

Measuring from center to center of holes

With my measuring machine it is possible to accurately measure from the center of one hole for example 355 (Fig. 6) to the exact center of another hole.

To accomplish this I remove the unit feeler 131 and insert in its place a rod 360 (Figs. 13 and 14) in the clamping sleeve 177. This rod has a hole 361 to receive a bushing 362 into which is inserted a gauge plug 363 the exact diameter of the hole 355 to where the measuring is to start from. Various sizes of bushings may be used to fit any size gauge plug 363 necessary.

First the gauge plug 363 is inserted in the first hole 355 and the carriages 100 and 135 set at "0." The carriages are then moved until the plug 363 can be inserted into the second hole 356. The reading of the disk verniers and determining the number of gauge blocks over which the plunger passed gives the operator the exact precise distance between the centers of the holes 355 and 356. Of course a smaller plug 363 must be used for hole 356, however the diameter of the plugs does not change the readings of the dimensions since the measurements are made from center to center of the holes and not from edge to edge of hole plugs as was done heretofore.

Modified form of gauge block holder

In Figs. 19 and 20 I have shown a modified form of gauge block holder. This type of holder can be used with either the lateral carriage 100 and disk 112 or the transverse carriage 135 and its disk 146.

Shown here are twenty gauge blocks 370 which are .050 of one inch thick, thus making 1.00 inch total thickness of all blocks 370. These blocks are mounted in a carrier 371 having two accurately ground pilot studs 372 spaced exactly 1.00 inch apart. These pilot studs 372 exactly fit in holes 373 in the bar 118 of the frame 30 when used with the lateral carriage 100. When the block carrier 371 is used with the transverse carriage 135 the holes 373 are in the bottom of the gauge groove in the top of carriage 100.

The same plungers 115 and 151 are used to co-operate with the beveled edges of the blocks 370 in the same manner as above described in connection with the gauge blocks 117 and 153.

The series of holes 373 are spaced exactly 1.00 inch apart all along the groove in the bar 118, and the carrier 371 with its group of blocks 370 is moved along in the bar 118 into various pairs of holes 373 depending upon how far the carriage 100 has travelled in order to be placed so as to be in co-operative relationship with the plunger 115.

Since the holes 373 are exactly 1.00 inch apart it is easy to determine how many full inches the carriage has travelled, by counting the holes to the right of the carrier 371 after it has been set in the above mentioned co-operative position with relation to the plunger 115 after movement of the carriage.

While the form of mechanism herein described is admirably adapted to fulfill the objects primarily stated, it is to be understood that I do not wish to limit my invention to the exact form shown and described as it is susceptible of other forms without departing from the true spirit of my invention.

What I claim is:

1. In a universal measuring machine, adapted to support work to be checked and/or measured for dimensions; an adjustable carriage movable towards and away from said work; a rotatable disk carried by said carriage, said disk having a periphery whose radial distance from the center varies from a minimum to a maximum; a movable carriage mounted on said adjustable carriage for movement at right angles to the direction of movement of the adjustable carriage; a rotatable disk carried by said movable carriage, said disk having a periphery whose radial distance from the center varies from a minimum to a maximum; a feeler device carried by the movable carriage and adapted to cooperate with the work to feel points thereon for measuring purposes; members contacting said rotatable disks at the minimum radial distance on each disk; carriers for said members, said carriers supported by said carriages; a plurality of gauge blocks mounted adjacent each other in a line along the line of displacement, said blocks having beveled surfaces at their upper extremities, said blocks being so arranged that the meeting point of successive blocks offers an abutment; and means integral with said contacting members, said means having beveled surfaces at their lower extremities matching the beveled surfaces of said blocks, said means adapted to be moved into contact with one of the gauge blocks and the adjacent abutment, depending upon the distance of travel of the carriages, to cause said contacting members to be moved away from their rotatable disks thus leaving gaps between the latter and said contacting members, said gaps being closed by turning the rotatable disks until they again contact the contacting members, whereby the precise micrometric measurement is obtained by reading the vernier graduations on the rotatable disks and by counting the number of gauge blocks passed by said means.

2. In a universal precision measuring machine adapted to support work to be checked and/or measured for dimensions; an adjustable carriage movable toward and away from said work; a rotatable disk with vernier graduations and being carried by said carriage, said disk having a periphery whose radial distance from the center varies from a minimum to a maximum; a movable carriage mounted on said adjustable carriage and adapted for movement at right angles to the direction of movement of the adjustable carriage; a rotatable disk with vernier graduations and being carried by said movable carriage, said disk having a periphery whose radial distance from the center varies from a minimum to a maximum; a feeler on the movable carriage and adapted to cooperate with the work for measuring purposes; means including slidably mounted members contacting said rotatable disks at their minimum radial distance, said means being mounted to travel along the line of travel of said carriages; a plurality of groups of gauge blocks, one group being mounted on a stationary part of the machine and in a line along the line of movement of said carriages and arranged adjacent each other to form abutments at each meeting point of the successive blocks, said blocks having beveled surfaces at the top, and another group of beveled top blocks mounted on said adjustable carriage in a line along the line of travel of said movable carriage and arranged to form abutments where said blocks touch each other; and means integral with said contacting members and having beveled lower ends to match the tops of said blocks, said means mounted to slide along the line of travel of said carriages and relative thereto and also mounted to slide perpendicularly to said line of travel, said integral means adapted to be moved into contact with one of the abutments when the integral means is moved perpendicular as their beveled lower ends cause such movement into contact with the abutment, and at the same time separating the contact members from the peripheries of the rotatable disks, thus leaving gaps between the disks and said contacting members, said gaps being closed by turning the disks until they again contact the contacting members, whereby the precise micrometric measurement is obtained from any point in any angular position to any other point in any angular position by reading the vernier graduations on said disks and counting the gauge blocks which have been passed by.

3. In a universal measuring machine adapted to support work to be checked and/or measured for dimensions; an adjustable carriage movable toward and away from the work; a graduated rotatable disk carried by the adjustable carriage, the disk having a periphery whose radial distance from the center varies from a minimum to a maximum; a movable carriage on the adjustable carriage and adapted for movement at right angles to the direction of movement of the adjustable carriage; a graduated rotatable disk on the movable carriage, the disk having a periphery whose radial distance from the center varies from a minimum to a maximum; a feeler on the movable carriage to cooperate with the work to feel for measuring purposes; members movable with the carriages and contacting the peripheries of said disks at the minimum radial distances, said movable members being slidably adjustable relative to their rotatable disks; a plurality of groups of beveled edged gauge blocks, one group being mounted in a stationary part of the machine in a line along the line of travel of the movable members and forming abutments at each meeting point of the successive blocks, and another group of beveled edged blocks being mounted in the movable carriage in a line along the line of travel of said associated movable member and forming abutments at each juncture of the successive blocks; and beveled edged means integral with said contacting members and adapted for vertical and lateral movements relative to said carriages and also movable along the line of travel of said carriages, said vertical movement bringing the beveled edged means into contact with the adjacent beveled edged gauge blocks thus causing said lateral movement of said means to move said means into contact with one of abutments of the gauge blocks of each group of blocks depending on the distances of travel of the carriages to cause the movable contacting members to be moved away from their graduated rotatable disks thus leaving gaps between the contacting members and the disks, said gaps being closed by turning the rotatable disks until they again contact the contacting members, whereby the precise micrometric measurements are obtained by reading the graduations on the disks and by counting the gauge blocks passed by said means.

4. In a universal measuring machine adapted to support work to be measured for dimensions; an adjustable carriage movable toward and away from the work; a graduated rotatable disk on said carriage, a part of the periphery of the disk being concentric with its center, the remainder of the periphery rising from a minimum radial distance from the center at one end of the concentric area to a maximum radial distance .050 greater from the center of said disk; a movable carriage on the adjustable carriage and movable at right angles to the direction of movement of the adjustable carriage; a second rotatable disk carried by the movable carriage, said second disk being like the first disk; a feeler device on the movable carriage to feel points on the work for measuring purposes; a plurality of groups of gauge blocks having beveled upper surfaces, one group of blocks being associated with each of the carriages and the disks of the respective carriage and being mounted in line along the line of movement of the carriages and forming abutments at the meeting points of the successive blocks; members movable with the carriages and contacting the peripheries of the disks on the carriages and being vertically and laterally adjustable relative to the rotatable disks and relative to the blocks and abutments; and means integral with the contacting members and having beveled lower surfaces adapted to coincide with the beveled surfaces on the gauge blocks upon vertical movement of said members and cause the latter to be moved into contact with one of the abutments of the blocks of each associated group of blocks depending on the distances of travel of the carriages to cause the contacting members to be moved away from their associated disks an extent not over .050 thus leaving variable gaps between the contacting members and the peripheries of the disks, said gaps being closed by turning the disks until they contact the contacting members to obtain the desired precise micrometric measurements now registered by the gauge blocks and the peripheries of said disks.

5. In a measuring machine adapted to support work and having a plurality of carriages, one supporting the other and having right angular relative movements one to the other; a graduated rotatable disk on each carriage and having peripheries whose radial distance from the center varies from a minimum to a maximum; a plurality of groups of beveled edge gauge blocks, one group being associated with each carriage and its rotatable disk, said groups of blocks being mounted in line and along the line of displacement, said blocks forming abutments at the meeting points of each successive blocks; movable means carrying each group of blocks; stationary means to support said movable means and having a plurality of pairs of apertures therein; locating pilots on the movable means adapted to be inserted in various pairs of apertures depending upon the positions of adjustment of the carriages; and vertically and laterally slidably mounted contact members having beveled edged lower ends, said members normally contacting the rotatable disks at the minimum radial distance point on the disks, said contacting members adapted to be moved away from the rotatable disks and into contact with the beveled edges of the gauge blocks in any position of adjustment of the movable means thus creating gaps between the contacting members and the rotating disks, the gaps being closed by turning the disks until their peripheries again contact the contacting members to determine the travel of the carriages to obtain precise micrometric measurements of the work.

References Cited in the file of this patent

UNITED STATES PATENTS

| | | |
|---|---|---|
| 292,927 | Lipe | Feb. 5, 1884 |
| 1,323,267 | Hanson | Dec. 2, 1919 |
| 1,637,921 | Simpson | Aug. 2, 1927 |
| 2,000,926 | Cox | May 14, 1935 |
| 2,200,884 | Hoagland | May 14, 1940 |
| 2,236,881 | Rusnak | Apr. 1, 1941 |
| 2,343,637 | Bochenek | Mar. 7, 1944 |
| 2,359,018 | Balk | Sept. 26, 1944 |
| 2,406,515 | Studler | Aug. 27, 1946 |
| 2,470,458 | Barr | May 17, 1949 |
| 2,482,051 | Yingling | Sept. 13, 1949 |
| 2,504,961 | Braaten | Apr. 25, 1950 |
| 2,508,837 | Peffers | May 23, 1950 |
| 2,524,538 | Pearson | Oct. 3, 1950 |
| 2,564,566 | Duffy | Aug. 14, 1951 |
| 2,565,787 | Tennant | Aug. 28, 1951 |
| 2,612,697 | Mathson | Oct. 7, 1952 |

FOREIGN PATENTS

| | | |
|---|---|---|
| 871,738 | France | May 7, 1942 |